(12) United States Patent
Wong et al.

(10) Patent No.: US 8,626,962 B2
(45) Date of Patent: Jan. 7, 2014

(54) TILT AND TRIM SENSOR APPARATUS

(75) Inventors: Ray Tat Lung Wong, Richmond (CA); Michael Gordon Lowrie, Langtoy (CA)

(73) Assignee: Marine Canada Acquisition Inc., Richmond (CA)

( * ) Notice: Subject to any disclaimer, the term of this patent is extended or adjusted under 35 U.S.C. 154(b) by 204 days.

(21) Appl. No.: 12/829,952

(22) Filed: Jul. 2, 2010

(65) Prior Publication Data

US 2011/0004362 A1 Jan. 6, 2011

Related U.S. Application Data

(60) Provisional application No. 61/222,817, filed on Jul. 2, 2009.

(51) Int. Cl.
*G06F 13/38* (2006.01)
*G05B 19/042* (2006.01)

(52) U.S. Cl.
CPC .......... *G06F 13/385* (2013.01); *G05B 19/0423* (2013.01)
USPC .............................................. 710/16; 710/63

(58) Field of Classification Search
CPC .................. G05B 19/0423; G05B 2219/31125
USPC .................................... 701/21; 440/84; 710/69
See application file for complete search history.

(56) References Cited

U.S. PATENT DOCUMENTS

| | | |
|---|---|---|
| 4,788,489 A | 11/1988 | Kobayashi et al. |
| 4,794,841 A | 1/1989 | Kemmler et al. |
| 4,901,628 A | 2/1990 | Krage |
| 5,685,377 A | 11/1997 | Arstein et al. |
| 5,717,330 A | 2/1998 | Moreau et al. |
| 5,813,313 A | 9/1998 | Stoll et al. |
| 6,322,404 B1 | 11/2001 | Magee et al. |
| 6,509,733 B2 | 1/2003 | Blubaugh et al. |
| 6,588,313 B2 | 7/2003 | Brown et al. |
| 6,722,261 B1 | 4/2004 | Brown et al. |
| 6,726,511 B1 | 4/2004 | Schelman |
| 6,745,666 B2 | 6/2004 | Zilioli |
| 6,824,435 B2 | 11/2004 | Divisi |
| 6,951,067 B1 | 10/2005 | Dietz et al. |
| 7,023,199 B2 | 4/2006 | Blubaugh et al. |
| 7,121,185 B2 | 10/2006 | Alrefai |
| 7,208,940 B2 | 4/2007 | Withanawasam et al. |
| 7,225,060 B2 * | 5/2007 | O'Connor et al. ................. 701/1 |
| 7,230,419 B2 * | 6/2007 | Godoy et al. ............ 324/207.25 |

(Continued)

OTHER PUBLICATIONS

U.S. Appl. No. 12/464,238, filed Nov. 26, 2009, Sall et al.

(Continued)

*Primary Examiner* — James Trammell
*Assistant Examiner* — Todd Melton
(74) *Attorney, Agent, or Firm* — Cameron IP

(57) ABSTRACT

The present invention relates a tilt and trim sensor apparatus having a housing and a shaft rotatably mounted to the housing. The apparatus includes a magnet connected to one of the housing and the shaft. The apparatus includes a transducer connected to another of the housing and shaft. The transducer is disposed adjacent to the magnet for sensing the position of the magnet and is operable to generate an output representative of an angular position of the magnet. The apparatus has a microprocessor for sensing gauge display input requirements. The apparatus has output circuitry for outputting a signal based on the output of the transducer that is in accordance with the gauge display input requirements.

11 Claims, 13 Drawing Sheets

(56) References Cited

U.S. PATENT DOCUMENTS

| | | | |
|---|---|---|---|
| 7,288,931 B2* | 10/2007 | Granig et al. | 324/202 |
| 8,495,263 B2* | 7/2013 | Harish | 710/63 |
| 2009/0083459 A1* | 3/2009 | Harish | 710/63 |
| 2009/0134927 A1* | 5/2009 | Thomas et al. | 327/306 |
| 2009/0288554 A1 | 11/2009 | Sall et al. | |

OTHER PUBLICATIONS

"Hall effect sensor", http://en.wikipedia.org/wiki/Hall_effect_sensor, May 12, 2009.

* cited by examiner

Flow Chart of the Calibration Routine

TILT AND TRIM SENSOR APPARATUS

CROSS REFERENCE TO RELATED APPLICATION

This application claims the benefit of provisional application 61/222,817 filed in the United States Patent and Trademark Office on Jul. 2, 2009, the disclosure of which is incorporated herein by reference and priority to which is claimed.

FIELD OF THE INVENTION

The present invention relates to a tilt and trim sensor apparatus and method. In particular, it relates to a tilt and trim sensor apparatus and method of calibrating the apparatus for a marine craft.

DESCRIPTION OF THE RELATED ART

It is known to use a rotary trim position sensor for sensing the position of an actuator comprising a trim cylinder and a piston reciprocatingly mounted therein. For a two-wire system with a single gauge application, a variable resistor may be used that varies its output as a function of trim angle. For a three-wire system, a potentiometer having a variable voltage may be used that varies its output as a function of trim angle. There may also be provided dual analog gauges for multiple helms.

However, the above systems, including for example a two-wire single analog system, a three-wire single/dual analog system, or a three-wire dual analog system, require separate components.

Also, conventional rotary position sensors require manual calibration. This may be time consuming.

BRIEF SUMMARY OF INVENTION

The present invention provides a tilt and trim sensor apparatus that overcomes the above disadvantages. It is an object of the present invention to provide an improved tilt and trim sensor apparatus.

There is provided a tilt and trim sensor apparatus. The apparatus has a housing and a shaft rotatably mounted to the housing. The apparatus includes a magnet connected to one of the housing and the shaft. A transducer is connected to another of the housing and shaft. The transducer is disposed adjacent to the magnet for sensing the position of the magnet and outputting a signal representative of an angular position of the magnet. The apparatus has output circuitry including a terminal for connecting to one of an analog gauge display unit and a digital gauge display unit. The apparatus includes a microprocessor configured to ascertain an electrical characteristic at the terminal and determine whether the display unit is the analog gauge display unit or the digital gauge display unit based therefrom. The microprocessor is configured to receive the signal from the transducer. The microprocessor is configured to operatively tailor the signal for the one of the analog gauge display unit and digital gauge display unit so determined.

There is also provided a tilt and trim sensor apparatus having a housing and a shaft rotatably mounted to the housing. The apparatus includes a magnet connected to one of the housing and the shaft. The apparatus includes a magnetoresistive transducer connected to another of the housing and shaft. The magnetoresistive transducer is disposed adjacent to the magnet for sensing the position of the magnet and is operable to generate an output representative of an angular position of the magnet. The apparatus includes a microprocessor for sensing gauge display input requirements. The apparatus includes output circuitry for outputting a signal based on the output of the magnetoresistive transducer that is in accordance with the gauge display input requirements.

There is further provided a tilt and trim sensor apparatus for an outboard propulsion unit. The outboard propulsion unit is pivotally connectable to a stern bracket of a marine craft via a pivot point. The apparatus includes a housing operatively mounted to one of the outboard propulsion unit and the stern bracket. A shaft is rotatably mounted to the housing. The shaft aligns with the pivot point and operatively connects to another of the outboard propulsion unit and the stern bracket. The apparatus includes a magnet adjacent to the pivot point and connected to one of the housing and the shaft. The apparatus includes a magnetoresistive transducer connected to another of the housing and shaft. The magnetoresistive transducer is aligned adjacent to the magnet for sensing the position of the magnet. The magnetoresistive transducer is operable to generate an output representative of an angular position of the outboard propulsion unit relative to the stern bracket. The apparatus includes a microprocessor for sensing the gauge display input requirements of the marine craft. The apparatus includes output circuitry for outputting a signal based on the output of the magnetoresistive transducer that is in accordance with the gauge display input requirements of the marine craft.

There is yet further provided a method of calibrating a tilt and trim sensor apparatus. The apparatus is operatively connected to an outboard propulsion unit. The method includes configuring the apparatus to generate output values that vary as a function of the tilt or trim position of the outboard propulsion unit. The method includes moving the outboard propulsion unit from a first position to a second position at least two times. At least two first position output values and at least two second position output values are generated thereby. The method includes configuring the apparatus to determine the degree of variation in the at least two first position output values and the at least two second position output values, store an average first position output value equal to the average of the at least two first position output values when the degree of variation in the at least two first position output values is within a set threshold, and store an average second position output value equal to the average of the at least two second position output values when the degree of variation in the at least two second position output values is within the set threshold. The method includes configuring the apparatus to use linear interpolation to ascertain the tilt or trim positions of the outboard propulsion unit corresponding to other output values upon determining the average first position output value and the average second position output value.

BRIEF DESCRIPTION OF DRAWINGS

Referring to the drawings.

DESCRIPTION OF THE PREFERRED
EMBODIMENTS

Figure 1:
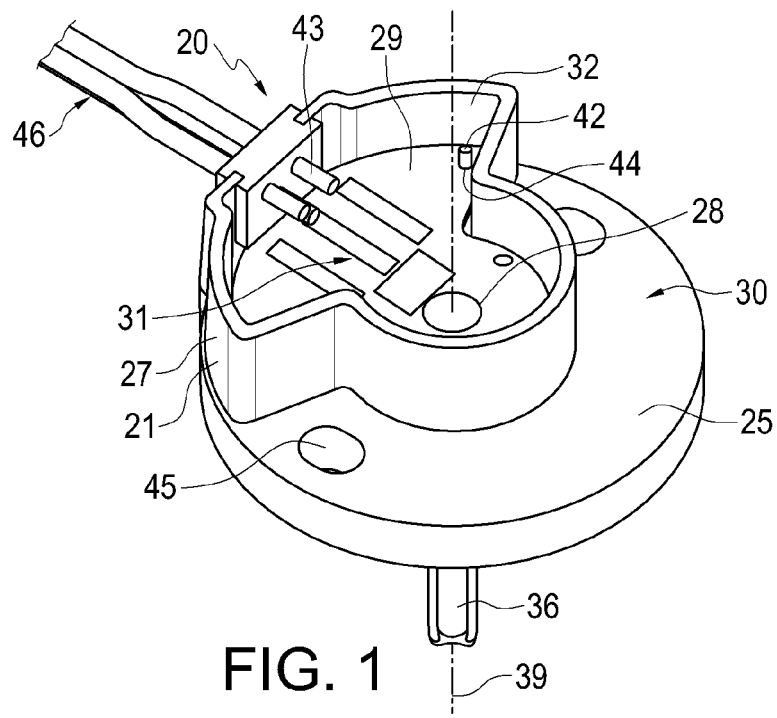
FIG. 1 is an isometric view of a tilt and trim sensor apparatus according to one embodiment, with an over-seal potting compound not shown.
Figure 2:
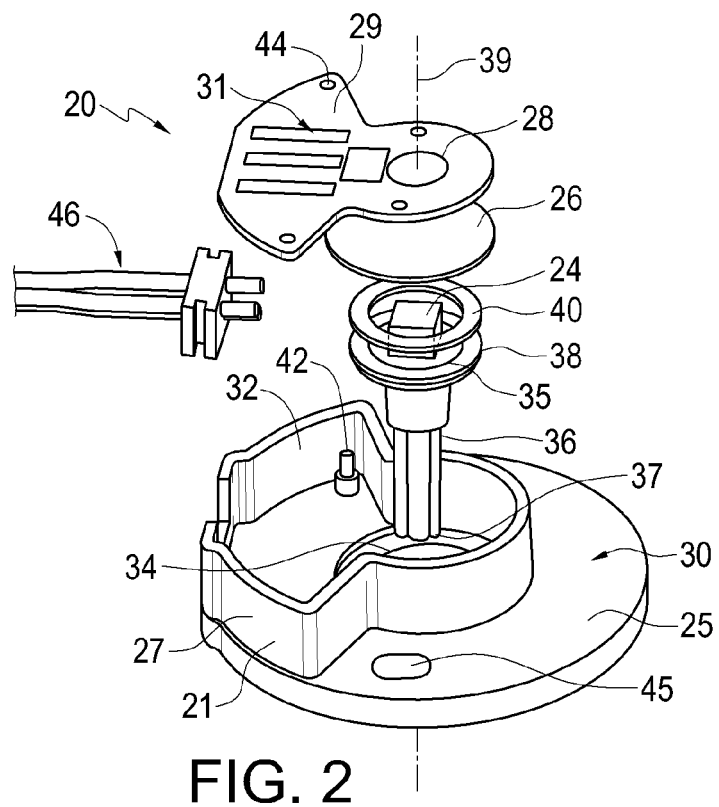
FIG. 2 is an exploded, isometric view of the tilt and trim sensor apparatus of FIG. 1.

Referring to the drawings and first to FIGS. 1 and 2, there is provided a trim and tilt sensor apparatus indicated generally by numeral 20. The sensor apparatus 20 has a housing 30. The housing 30 in this example includes a disc-shaped portion 25 and a portion 27 formed by a curved wall 21 extending from portion 25 and surrounding a recess 32. The disc-shaped portion 25 includes a pair of spaced-apart apertures as shown by aperture 45. As shown in FIG. 2, the housing 30 has a central aperture 34.

The sensor apparatus 20 includes a rotatable portion, in this example a rotatable interface shaft 36. The rotatable interface shaft 36 extends through the central aperture 34. The rotatable interface shaft 36 is aligned with an axis of rotation 39 and is rotatably mounted to the housing 30 via, in this example, a bearing 38. The rotatable interface shaft 36 has a first end 35 and a second end 37 opposite the first end 35.

The sensor apparatus 20 includes a magnet 24 mounted on the first end 35 of the rotatable interface shaft 36 in this example. The magnet 24 in this example is a ceramic 8 magnet. An annular spacer 40 is disposed on top of the bearing 38, from the perspective of FIG. 2. The annular spacer 40 is adjacent to the magnet 24. A magnet cover 26 is disposed on top of the annular spacer 40, from the perspective of FIG. 2. The end 35 of the rotatable interface shaft 36, the annular spacer 40 and the magnet cover 26 together form an enclosure for containing the magnet 24.

The sensor apparatus 20 includes a magnetic rotary position sensor, in this example, a magnetoresistive transducer 28. The magnetoresistive transducer 28 is disposed upon a semiconductor substrate 29 shaped to fit within recess 32. The substrate 29 is secured to the housing 30 via a protrusion 42 of the housing that passes through an aperture 44 of the substrate 29. The magnetoresistive transducer 28 is disposed adjacent to the magnet 24 to enable the magnetoresistive transducer 28 to interact with the magnet 24. The magnet cover 26 in this example is interposed between the magnet 24 and the magnetoresistive transducer 28. The magnetoresistive transducer 28 in this example outputs a voltage indicative of the angular position of the magnetic field of the magnet 24. Magnetoresistive transducers per se are well known to those skilled in the art. For example, magnetoresistive transducers are disclosed in U.S. Pat. No. 7,208,940 to Withanawasam, et al., the full disclosure of which is incorporated herein by reference.

The sensor apparatus 20 includes a microprocessor generally indicated by numeral 31. The microprocessor 31 is disposed on the substrate 29. The microprocessor 31 in this example is an Atmel® ATTiny84V type CPU, though those skilled in the art will appreciate that other processors may be used. The microprocessor 31 is operatively connected to and configured to receive signals from the magnetoresistive transducer 28. The microprocessor 31 is configured to ascertain the voltage output across the transducer 28.

Figure 12:
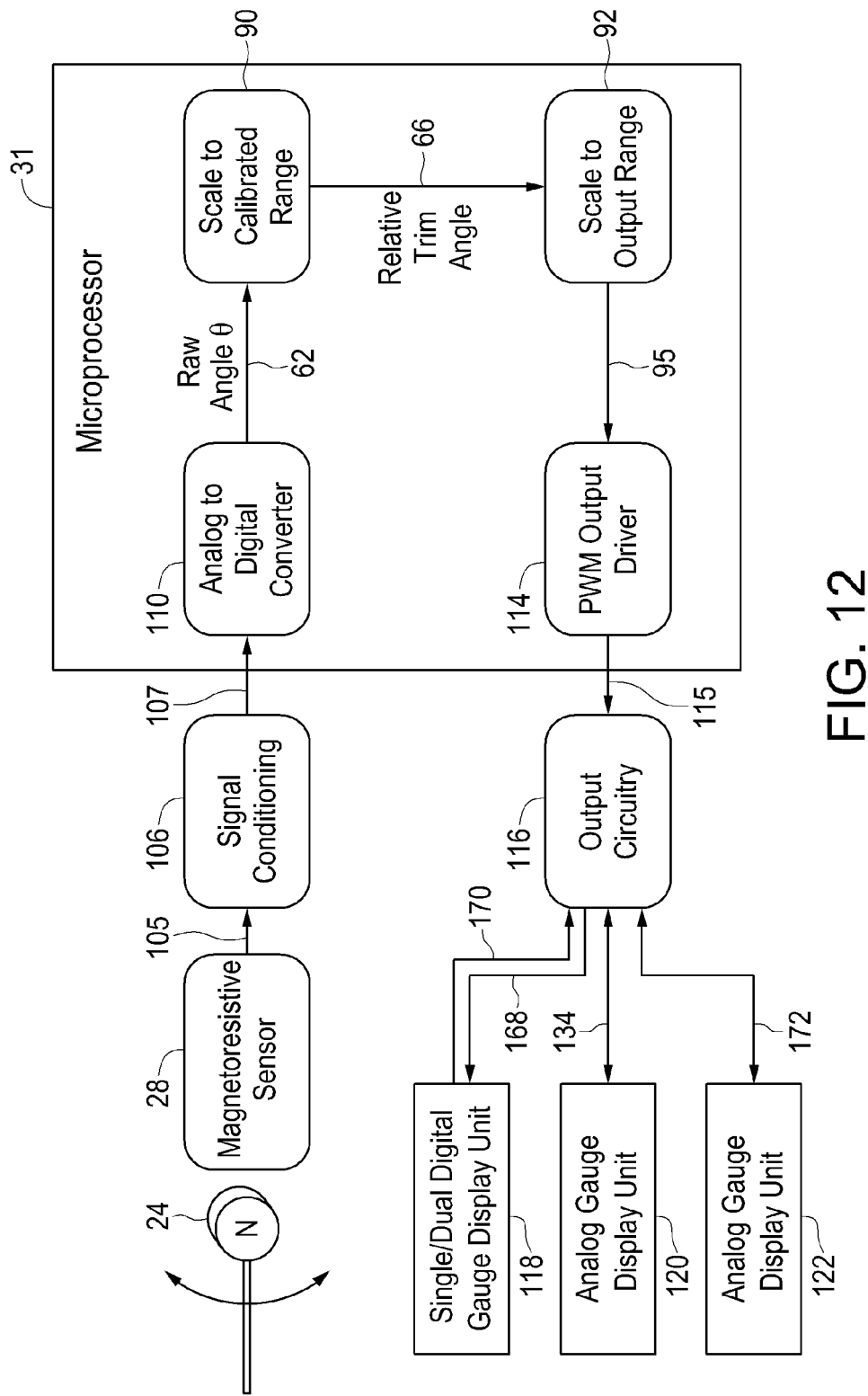
FIG. 12 is a block diagram of the functioning of the tilt and trim sensor apparatus of FIG. 1 shown in greater detail, including output circuitry of the tilt and trim sensor apparatus.

The sensor apparatus 20 in this example receives power via a gauge display unit, such as one of the units 118, 120 or 122 shown in FIG. 12. The sensor apparatus 20 and gauge display unit(s) are operatively and functionally connected together via cables 46 shown in FIG. 1. A three-pronged plug 43 in this example extends from the cables 46 and is adapted to plug into the sensor apparatus 20 via a corresponding socket (not shown). The microprocessor 31 and magnetoresistive transducer 28 are thus powered by the gauge display unit.

Figure 3:
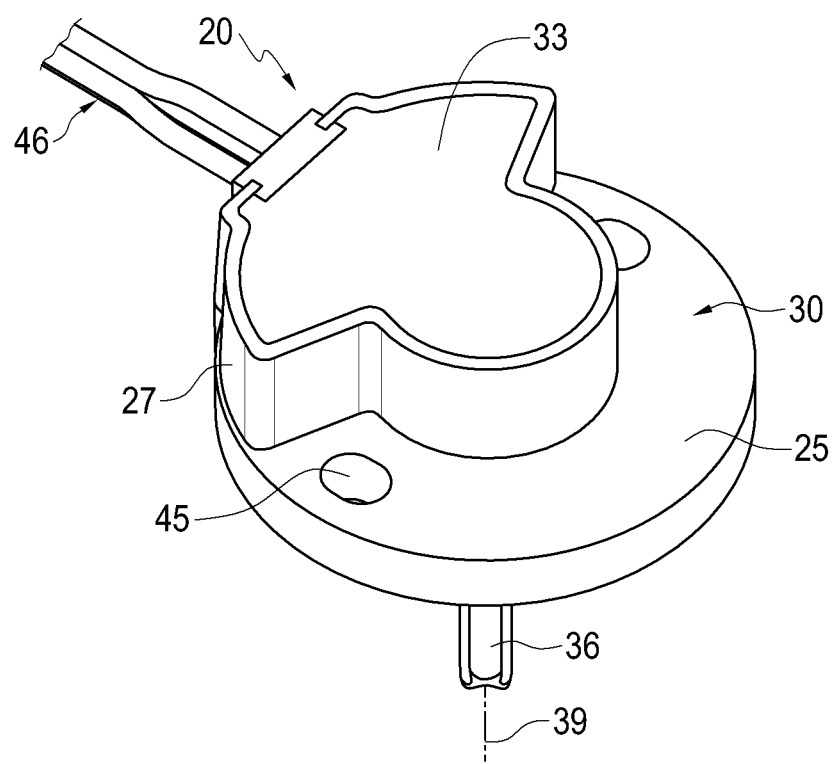
FIG. 3 is an isometric view of the tilt and trim sensor apparatus shown in FIG. 1 showing the over-seal potting compound.

In one preferred embodiment, recess 32 is completely filled and thereby sealed with over-seal potting compound 33, as shown in FIG. 3. The potting compound 33 protects the magnetoresistive transducer 28, the microprocessor 31, the plug 43 and various other parts and circuitry, inhibiting damage such as water damage that may otherwise occur.

Figure 4:
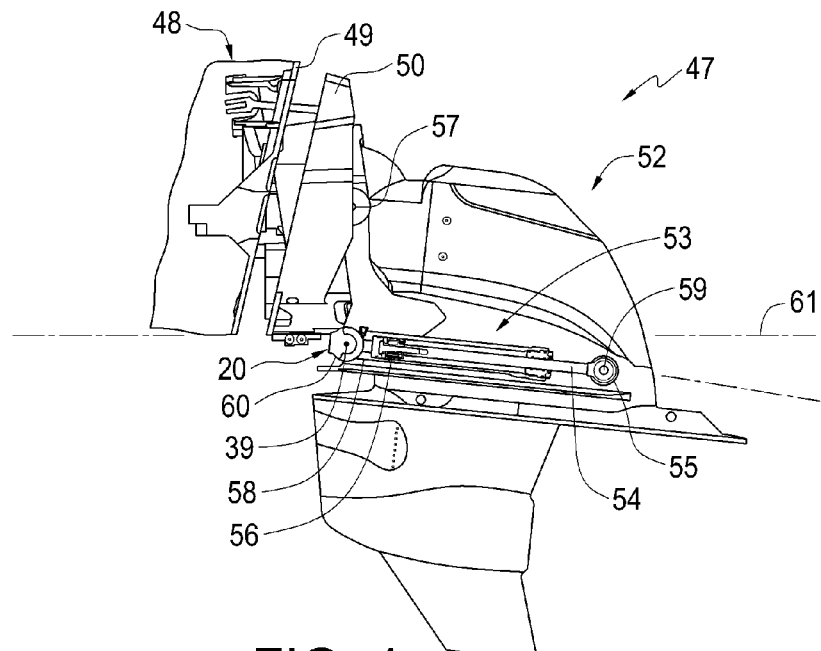
FIG. 4 is an elevation view of a marine craft (shown in fragment) with an outboard propulsion unit shown in a fully lowered position, the trim cylinder thereof being broken away and the unit being equipped with the tilt and trim sensor apparatus of FIG. 1.

Referring to FIG. 4, the tilt and trim sensor apparatus 20 as disclosed herein is shown in combination with a trim and tilt system, indicated generally by reference numeral 47.

Figure 5:
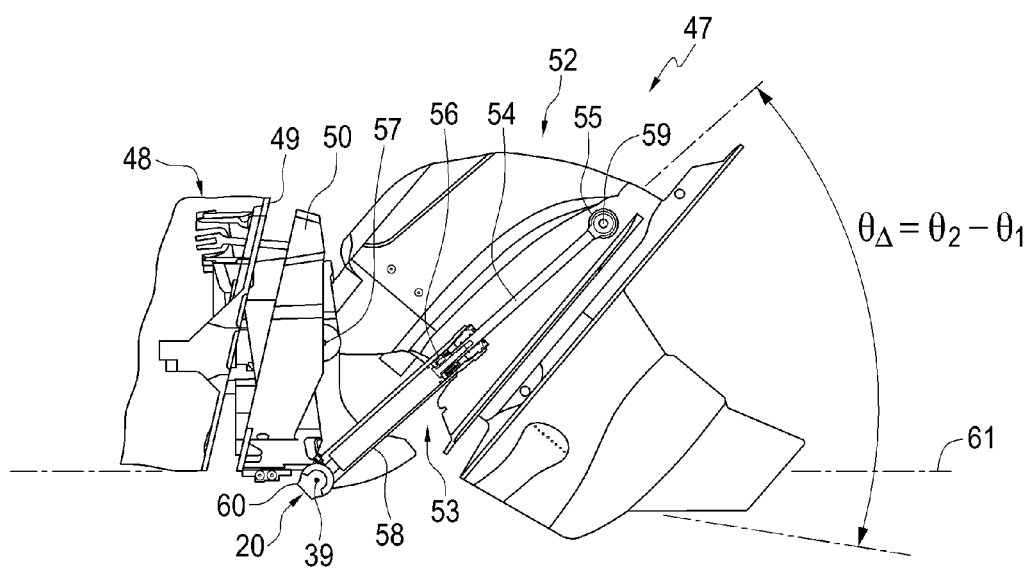
FIG. 5 is an elevation view of the marine craft of FIG. 4 with the outboard propulsion unit shown in a fully raised position.

The trim and tilt system 47 operates to position an outboard propulsion unit 52 between a lower position shown in FIG. 4 and an upper position shown in FIG. 5.

The trim and tilt system 47 is operatively mounted to a stern 49 of a marine craft 48 (shown in fragment). The trim and tilt system 47 includes a stern bracket 50. The stern bracket 50 is mounted on the stern 49 of the marine craft 48. The outboard propulsion unit 52 is pivotally connected to the marine craft 48 at pivotal connection 57 which is located in this example midway along the stern bracket 50.

The trim and tilt system 47 includes a trim and tilt cylinder apparatus generally indicated by reference numeral 53. The trim and tilt cylinder apparatus 53 has a cylinder 58, a rod 54 and a piston 56 connected to the rod 54. The piston 56 is slidably engageable with and disposed within the cylinder 58. The rod 54 is partially disposed within the cylinder 58. The rod 54 has an end 55 spaced-apart from the piston 56. End 55 is pivotally connected to the outboard propulsion unit 52 via pivotal connection 59. The trim and tilt cylinder apparatus 53 has an end 60 spaced-apart from end 55. End 60 is operatively connected to the cylinder 58. End 60 is pivotally supported by the stern bracket 50 at a pivot point coinciding with the axis of rotation 39 shown in FIGS. 1 and 2.

The trim and tilt sensor apparatus 20 connects to the trim and tilt cylinder apparatus 53 at end 60 in this example. Referring to FIGS. 2 and 5, a pair of bolts (not shown) pass through the apertures 45 of the housing 30, and in turn through corresponding apertures (not shown) of the cylinder 58 near end 60, and threadably engage a pair of nuts (not shown). The housing 30 in this example is thereby operatively connected to the trim and tilt cylinder apparatus 53. The rotatable interface shaft 36 mates with a corresponding female part (not shown) operatively connected to the stern bracket 50. The rotatable interface shaft 36 in this example thereby operatively rotatably engages with the stern bracket 50.

Referring to FIG. 4, the outboard propulsion unit 52 is shown in a fully lowered position relative to horizontal axis 61 (from the perspective of the figure). In the fully lowered position, the rod 54 is in a fully retracted mode within the cylinder 58. The outboard propulsion unit 52 is at a first angular position or raw angle $\theta_1$ relative to the stern 49. The raw angle $\theta_1$ is the angle spanning from a given reference axis. The given reference axis corresponds to the given orientation of the tilt and trim sensor apparatus 20 once installed onto the trim and tilt cylinder apparatus 53. This orientation and thus the given reference axis may vary due to, for example, variations in how the apparatus 20 is installed. The term "raw" is used because the raw angle $\theta_1$ is as yet unprocessed. The voltage across the magnetoresistive transducer 28 corresponds to the raw angle. This voltage varies as a function of the angular position of the trim and tilt cylinder apparatus 53.

Referring to FIG. 5, the outboard propulsion unit 52 is shown in a fully raised position (from the perspective of the figure). In the fully raised position, the rod 54 is in a fully extended mode, extending outwards from the cylinder 58. In the fully raised position the outboard propulsion unit 52 is at a second angular position or raw angle $\theta_2$.

Figure 6:
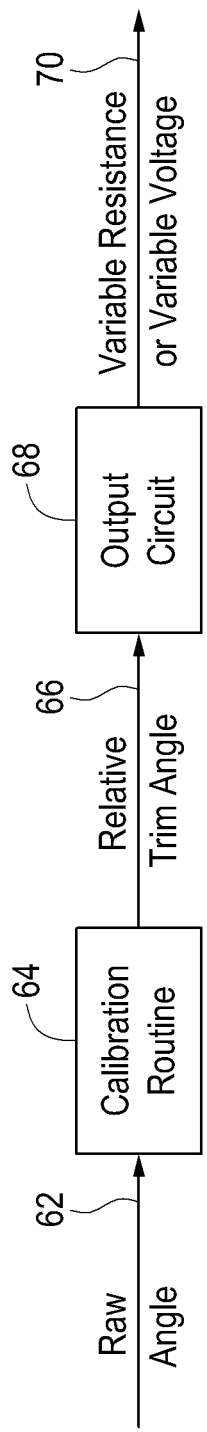
FIG. 6 is a simplified block diagram of the functioning of the tilt and trim sensor apparatus of FIG. 1.

Referring to FIG. 6, a simplified block diagram of the functioning of the tilt and trim sensor apparatus is provided. Raw angle 62, as discussed for FIGS. 4 and 5, is detected by the magnetoresistive transducer 28 based on the position of the magnet 24, as discussed for FIGS. 1 and 2. The tilt and trim sensor apparatus next undergoes a calibration routine 64 in order to determine the relative trim angle 66 of the outboard propulsion unit. Once the relative trim angle 66 is determined, this information is sent to an output circuit 68. For a given relative trim angle, the output circuit 68 is pre-programmed to provide an output that mimics a variable resistance or variable voltage 70. The output 70 may then be connected to, for example, the gauge display unit of the marine craft.

Each of these aspects of the tilt and trim sensor apparatus will now in turn be discussed in greater detail.

FIG. 12 is a block diagram showing the functioning of the tilt and trim sensor apparatus in greater detail. As the magnet 24 is rotated, the voltage across the magnetoresistive transducer 28 will vary. This is shown in the form of a signal 105 arising from the magnetoresistive transducer 28. The signal 105 undergoes signal conditioning 106, resulting in a conditioned signal 107. The conditioned signal 107 is then sent to the microprocessor 31. The microprocessor 31 converts the conditioned signal 107 from an analog signal to a digital signal representative of the raw angle 62, via an analog-to-digital converter 110.

Figure 7:
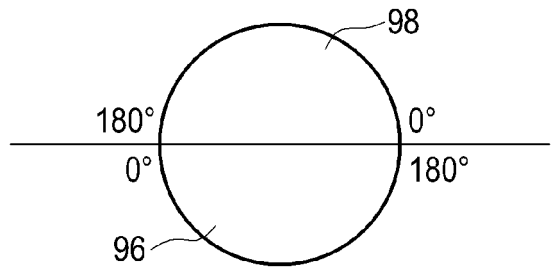
FIG. 7 is a graph of the sensing regions of the magnetoresistive transducer of the tilt and trim sensor apparatus.

Referring to FIG. 7, the magnetoresistive transducer has two sensing regions 96 and 98 for detecting the raw angle θ. The first sensing region 96 varies from 0 to 180 degrees and the second sensing region 98 varies from 0 to 180 degrees.

Figure 8:
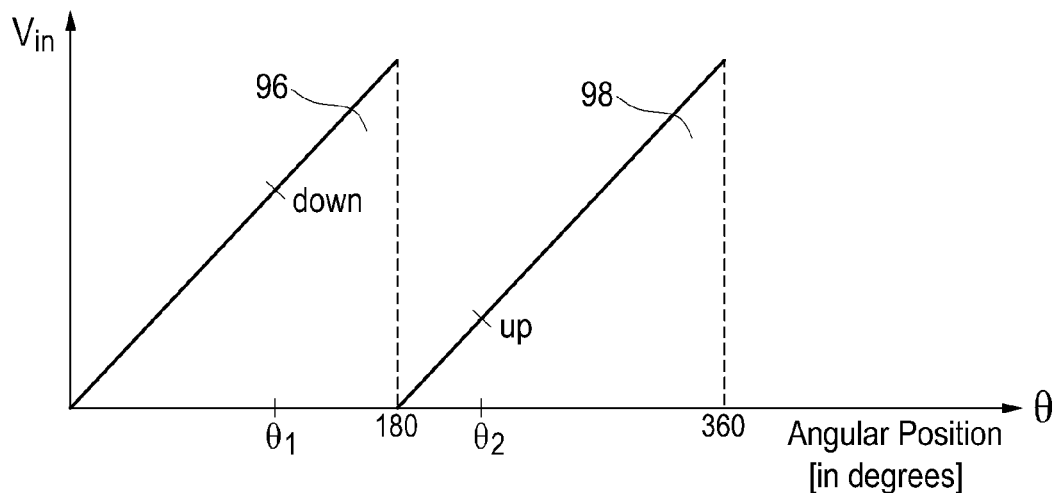
FIG. 8 is a graph of the voltage across the magnetoresistive transducer for a given angular position of the outboard propulsion unit relative to the stern.

Referring to FIG. 8, for a given raw angle θ as set out along the x-axis, the magnetoresistive transducer 28 provides a voltage $V_{in}$, as indicated along the y-axis. The voltage $V_{in}$ is indicative of the angular position of the magnetic field of the magnet 24, within 0 degree to 180 degree range. The voltage $V_{in}$ varies from zero to a given number within the first sensing region 96, as shown in FIG. 8. When the transducer rotates past said 180 degrees, the voltage drops to zero once more within the second sensing region 98. In the example, raw angle $\theta_1$ corresponds to the outboard propulsion unit 52 being in the fully lowered position shown in FIG. 4. Raw angle $\theta_2$ corresponds to the outboard propulsion unit 52 being in the fully raised position shown in FIG. 5.

Figure 10:
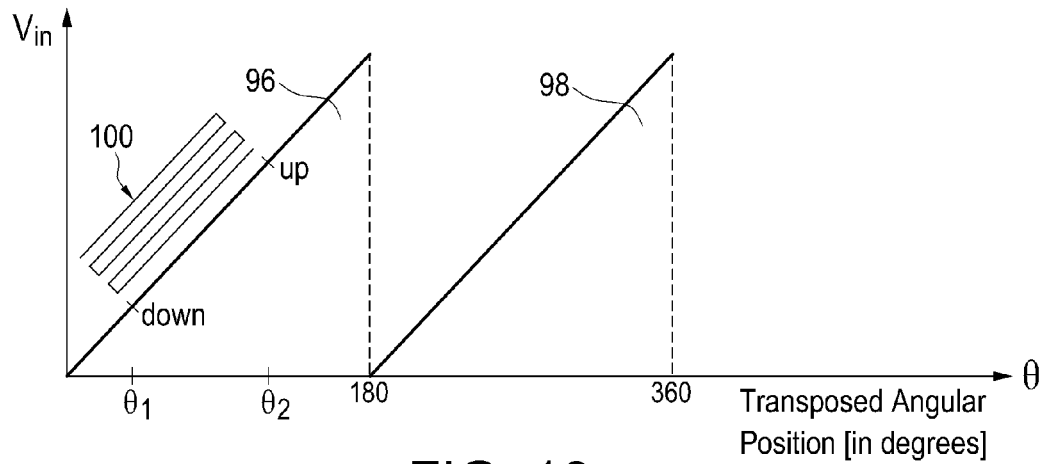
FIG. 10 is a graph of the voltage across the magnetoresistive transducer for given angular positions of the outboard propulsion unit relative to the stern, during the calibration routine.

Referring back to FIG. 12, once the raw angle 62 is in digital form, the microprocessor 31 employs an algorithm to offset the raw angles $\theta_1$ and $\theta_2$ so that both angles are transposed so as to be within only one sensing region. This is shown in FIG. 10 and discussed in more detail below.

Calibration of the Apparatus

Figure 9:
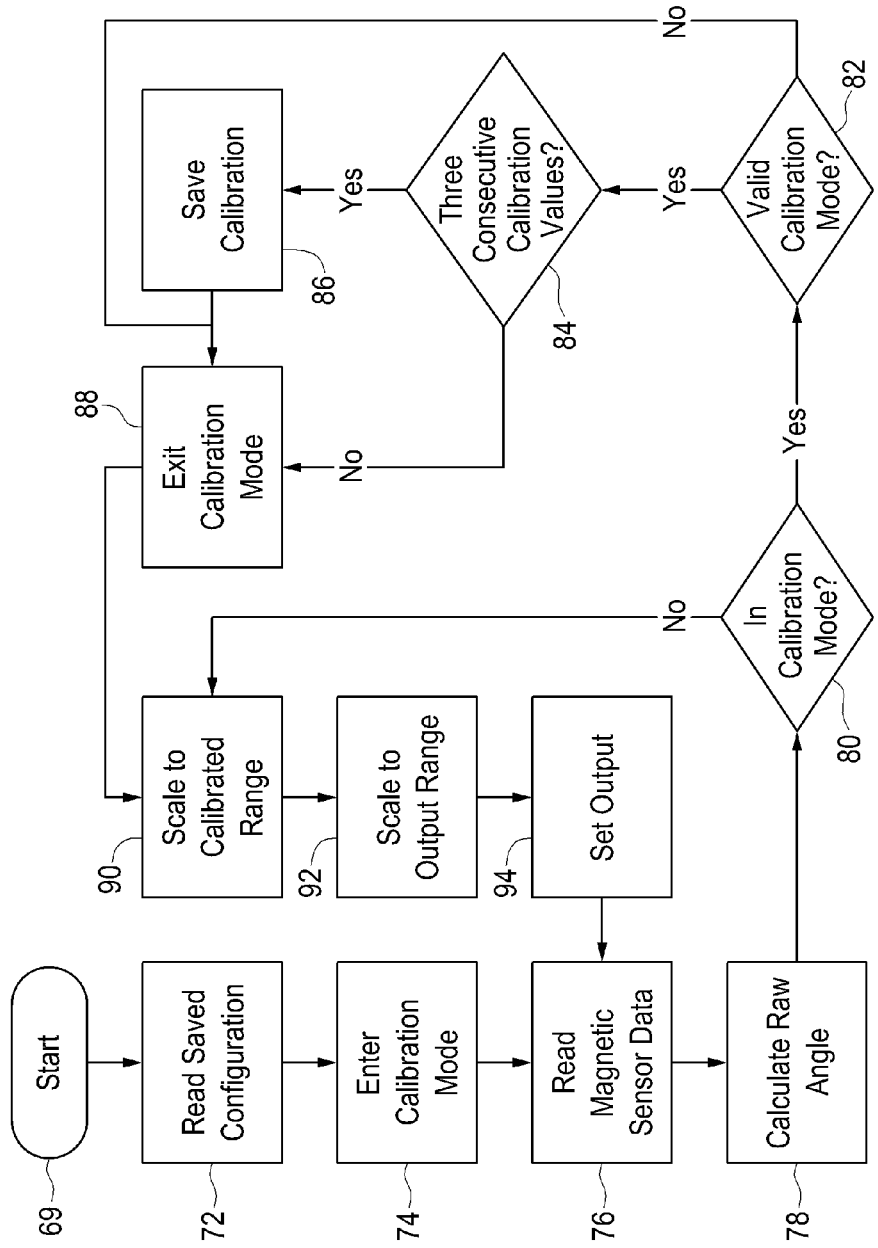
FIG. 9 is a flow chart of the calibration routine for calibrating the tilt and trim sensor apparatus, according to one aspect of the present invention.

The calibration routine for calibrating the tilt and trim sensor apparatus 64 is shown in greater detail in FIG. 9. When the tilt and trim sensor apparatus 20 is in operation, in start mode 69, the apparatus via the microprocessor has hysteresis and therefore first reads any previously saved configuration 72 from when the apparatus 20 was last operational. The apparatus 20 then automatically enters calibration mode 74. The apparatus 20 reads the magnetic sensor data (shown as box 76) acquired by the magnetoresistive transducer 28, and thereby calculates the raw angle θ at 78.

The microprocessor then determines if it is supposed to be in calibration mode, as indicated by diamond 80. In order to determine if the apparatus 20 is in a valid calibration mode 82, the outboard propulsion unit 52 undergoes a set routine, or plurality of motions. In this example the routine provides three consecutive calibration values 84 for a series of readings. Like other specific values stated herein, this could vary in other embodiments.

The calibration routine is completed within a certain amount of time. When the outboard propulsion unit is in a fully lowered position the magnetoresistive transducer 28 provides a first position output value. When the outboard propulsion unit is in a fully raised position the magnetoresistive transducer 28 provides a second position output value. In one preferred embodiment, first position output values must be within a certain range, the second position output values must be within a certain range, and the difference between the first and second position output values must be consistent within a certain range. In a preferred example, the outboard propulsion unit is raised and lowered three times between the fully lowered position shown in FIG. 4 and the fully raised position shown in FIG. 5.

This shown by way of illustration in FIG. 10 where the up and down cycles 100 overlie one another, but are spaced-apart in the drawing for clarity. The three first position output values of the raw angle $\theta_1$ in the fully lowered position of the outboard propulsion unit 52 must be within a certain range of each other for a valid calibration to occur. Likewise, the three second position output values of the raw angle $\theta_2$ in the fully raised position of the outboard propulsion unit must be within a certain range of each other. The three readings of angular range $\theta_A$, which is equal to raw angle $\theta_1$ minus raw angle $\theta_2$ or put another way, the first position output values minus the second position output values, must also be consistent within a certain margin of error.

According to one preferred embodiment a degree of variation for the three maximum value readings (fully raised position) of +/−5 degrees is acceptable. Likewise a degree of variation for the three minimum value readings (fully lowered position) of +/−5 degrees is acceptable and a degree of variation for the three overall span readings of +/−5 degrees is acceptable.

The total raising and lowering must occur within a certain time period or set time. In this case the total time within which the calibration routine must be completed within the set time of 120 seconds or less but this could vary in other embodiments. Each up and down cycle of the outboard propulsion unit 52 must occur within a further set time, in this example, 40 seconds in order to obtain a valid calibration.

Referring back to FIG. 9, once the above described calibration routine has been received in the form of three consecutive values for a series of the above readings, the calibration is saved, as indicated by the box 86. The calibration is saved into the non-volatile memory of the microprocessor 31 shown in FIG. 1. This may take the form of an average first position output value corresponding to an average raw angle $\theta_{1AVG}$ and an average second position output value corresponding to an average raw angle $\theta_{2AVG}$ being saved into the memory of the microprocessor 31. The next step is to exit the calibration mode, as shown by box 88. If the calibration routine does not provide a series of three consecutive values within the total time allowed, the microprocessor 31 resorts back to the previously saved data.

Figure 11:
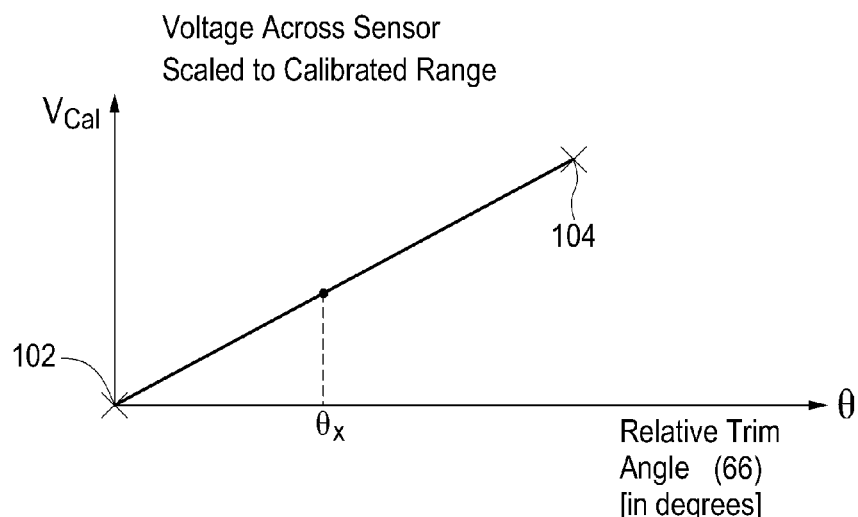
FIG. 11 is a graph of the voltage across the magnetoresistive transducer scaled to a calibrated range.

The next step is to scale to a calibrated range, as indicated by box 90. FIG. 11 shows an example of the voltage across the magnetoresistive transducer 28, shown in FIGS. 1 and 2, being scaled to a calibrated range. Calibrated voltage $V_{cal}$ across the magnetoresistive transducer is shown on the y-axis and the relative trim angle 66, shown in FIG. 12, is shown on the x-axis. First calibration end point 102, which previously corresponded to average raw angle $\theta_{1AVG}$, now corresponds to a calibrated voltage of zero. Second calibration end point 104, which previously corresponded to average raw angle $\theta_{2AVG}$, now corresponds to an upper calibrated voltage reading. The scaling is accomplished by the microprocessor 31 shown in FIG. 1. The microprocessor 31 provides a linear interpolation between points 102 and 104. Multi-linear interpolation is also possible for where a non-linear output is required. Scaling data is well known per se and will therefore not be discussed in greater detail.

As shown in FIGS. 9 and 12, the microprocessor 31 next scales the relative trim angle 66 to an output range 92 of output voltages. The scaled output range 92 is pre-programmed into the microprocessor 31. A user may specify the up and down output voltage levels for when the outboard propulsion unit is fully raised and fully lowered, respectively. This is illustrated in FIG. 9 by the "set output" box 94. Referring to FIG. 12, signal 95 resulting from the scaling of the output is transmitted to a PWM output driver 114.

Varying the outboard motor's trim varies the position of the magnetoresistive sensor and this in turn produces a varying output voltage. The calibration routine calibrates this output voltage and the microprocessor is thus able to ascertain the trim or tilt angle of the outboard motor. The microprocessor 31 must now convey this information in a form intelligible to the given gauge display unit(s).

The Output Circuitry

The trim and tilt sensor apparatus 20 includes output circuitry 116. The PWM output driver 114 via PWM voltage output 115 is in communication with the output circuitry 116. The output circuitry 116 generates analog or digital outputs depending on the model of the sensor apparatus. As further described below the apparatus 20 with its output circuitry 116 is configured to operate with a single/dual digital gauge display unit 118, an analog gauge display unit 120 and/or a further analog gauge display unit 122. The apparatus 20 as herein disclosed thus accommodates a plurality of different 2-wire single analog mode or 3-wire mode systems.

Figure 13:
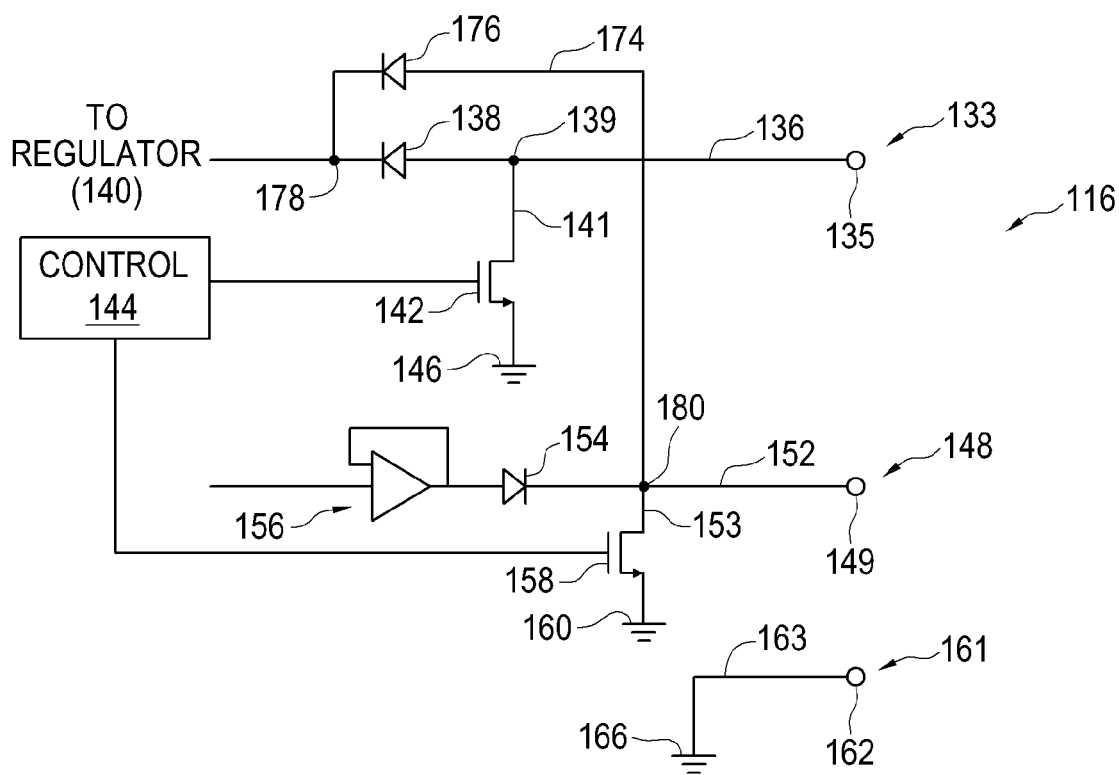
FIG. 13 is a schematic of the output circuitry shown in FIG. 12.

The output circuitry 116 is schematically shown in greater detail in FIG. 13. It includes a first circuit 133 having a terminal 135, a second circuit 148 having a terminal 149 and a third circuit 161 having a terminal 162. Terminals 135, 149 and 162 are selectively connectable with the digital and analog gauge display units 118, 120, and 122 shown in FIG. 12.

The first circuit 133 further comprises a conductor 136, a node 139, a diode 138, a junction 178, a conductor 141, a first switch 142 and ground 146. The terminal 135 is connected in series via the conductor 136 with the diode 138 which in turn is connected in series with a voltage regulator 140. The diode 138 is configured to allow current to flow from the terminal 135 to the regulator 140. The conductor 141 connects to the conductor 136 via node 139 located between the diode 138 and the terminal 135.

The first switch 142, in this example a mosfet switch, is connected to ground 146. The first switch 142 is connected to the node 139 via the conductor 141. Referring to FIG. 12, the PWM voltage output 115 drives the first switch 142. Referring back to FIG. 13, a single pin (not shown) of the microprocessor 31 controls the first switch 142. The first switch 142 is activated when the said single pin of the microprocessor 31 is activated and this is illustrated by control (box 144). The first switch 142 draws current from the first circuit 133 by connecting the first circuit 133 to ground 146 when activated.

The second circuit 148, in addition to including terminal 149, further comprises a conductor 152, a node 180, a diode 154, an operational amplifier 156, a conductor 153, a second switch 158 and a ground 160. The terminal 149 is connected in series via the conductor 152 to the diode 154. The conductor 153 connects to the conductor 152 via node 180. The node 180 is located between the diode 154 and the terminal 149. The second switch 158, also in this example a mosfet switch, is connected to ground 160. The second switch 158 is connected to the node 180 via the conductor 153.

The first circuit 133 is connectable to the second circuit 148 via a conductor 174, which connects to junction 178 and node 180. A diode 176 is interposed between the connection of the junction 178 and node 180. The diode 176 is oriented to allow current to flow from node 180 to junction 178 and thereby to the regulator 140.

The pin of the microprocessor 31 that activates the first switch 142 also activates the second switch 158. The second switch 158 draws current from the second circuit 148 by connecting the second circuit 148 to ground 160 when the second switch 158 is activated.

Diode 154 is connected in series with the operational amplifier 156. Diode 154 allows current to flow from the operational amplifier 156 to the terminal 149. Diode 154 inhibits current from flowing from the terminal 149 directly to the operational amplifier 156. Another pin of the microprocessor, which is different from that for the switches 142 and 158, activates the operational amplifier 156. Each pin (the pin for the switches and the pin for the operational amplifier) is controlled separately.

The third circuit 161, in addition to including terminal 162, further comprises a conductor 163 and a ground 166. The terminal 162 is directly connected to ground 166 via the conductor 163.

As mentioned above the apparatus 20 with its output circuitry 116 is configured to operate with a variety of systems.

Figure 14:
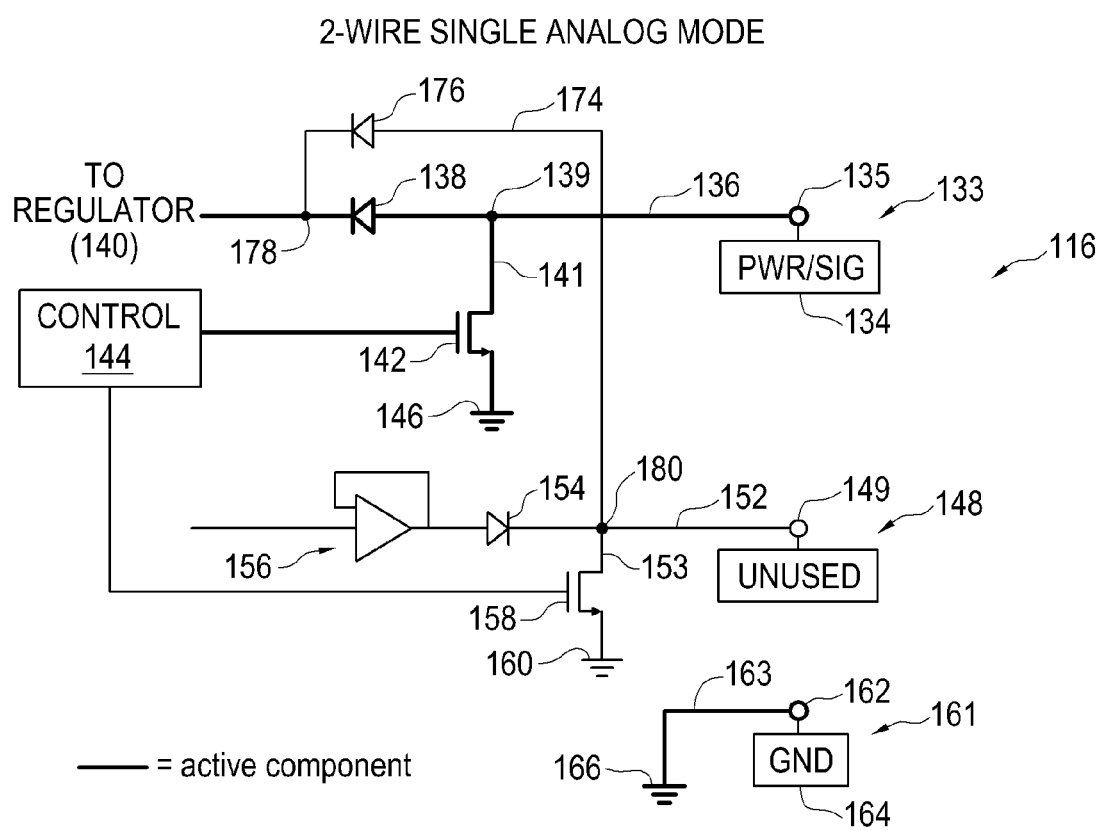
FIG. 14 is a schematic of the output circuitry of FIG. 13 shown operating in a 2-wire single analog mode.

The manner in which the apparatus 20 operates depends upon the manner in which the gauge display units are connected to terminals 135, 149 and 162 and depends upon whether they are analog or digital gauge display units. In this example the microprocessor 31 determines the operational mode, such as a 2-wire single analog mode, a 3-wire dual analog mode, or a 3-wire single/dual digital mode, based on the voltage measured by the microprocessor 31 at junction 178. The microprocessor is operatively ascertaining the voltage across the terminal 135. If the voltage is above a pre-programmed or set threshold, such as for example 6 volts at junction 178, the apparatus 20 operates in the 2-wire single analog mode as shown in FIG. 14 and/or the 3-wire dual analog mode shown in FIG. 17. If the voltage is below the set threshold, having a voltage for example of 4 to 5 volts at junction 178, the apparatus 20 operates in the 3-wire single/dual digital mode as shown in FIG. 18.

Alternatively the microprocessor and accompanying circuitry can measure other electrical characteristics of the gauge such as current consumption or source impedance to determine the operating mode.

2-Wire Single Analog Mode

Referring first to FIG. 14 this shows the operation of the apparatus 20 with its output circuitry 116 in the 2-wire single analog mode. Terminal 135 is connectable to a power/signal wire 134 of the analog trim gauge display unit 120 (or trim sender), shown in FIG. 12. Terminal 162 is connected to a ground wire 164 of the analog trim gauge display unit. Terminal 149 is unused because only one analog trim gauge display unit is being used.

The microprocessor ascertains that the voltage at junction 178 (or across the power/signal wire) is above the set threshold. The microprocessor 31 thus causes the output circuitry 116 to operate in 2-wire single analog mode. In this case the microprocessor activates the "active" components of the output circuitry 116 illustrated in FIG. 14 by way of slightly darker font lines.

The power/signal wire 134 provides power to the output circuitry 116 and the microprocessor 31. In the 2-wire single analog mode, the pin of the microprocessor 31, as illustrated by control 144, is activated for controlling and selectively switching on the first switch 142. When the first switch 142 does not have a signal applied to it from the microprocessor 31, junction 178 sees normal power from the analog gauge display unit 120 via terminal 135. This is used to power the microprocessor 31 and other supporting electronics. Current passes through diode 138 to the voltage regulator 140, which regulates voltage applied to the microprocessor 31 and magnetoresistive transducer 28. The voltage regulator 140 may step down, for example, a supply voltage of 12 volts to, for example, slightly above 6 volts.

When the microprocessor applies a "high" signal to the first switch 142, it causes the switch 142 to connect terminal 135 to ground which sinks current. Junction 178 does not see ground because capacitors farther downstream have accumulated sufficient energy to keep the microprocessor 31 and other electronics operational during this time. Diodes 138 and 176 keep this stored up energy from being lost.

Figure 15:
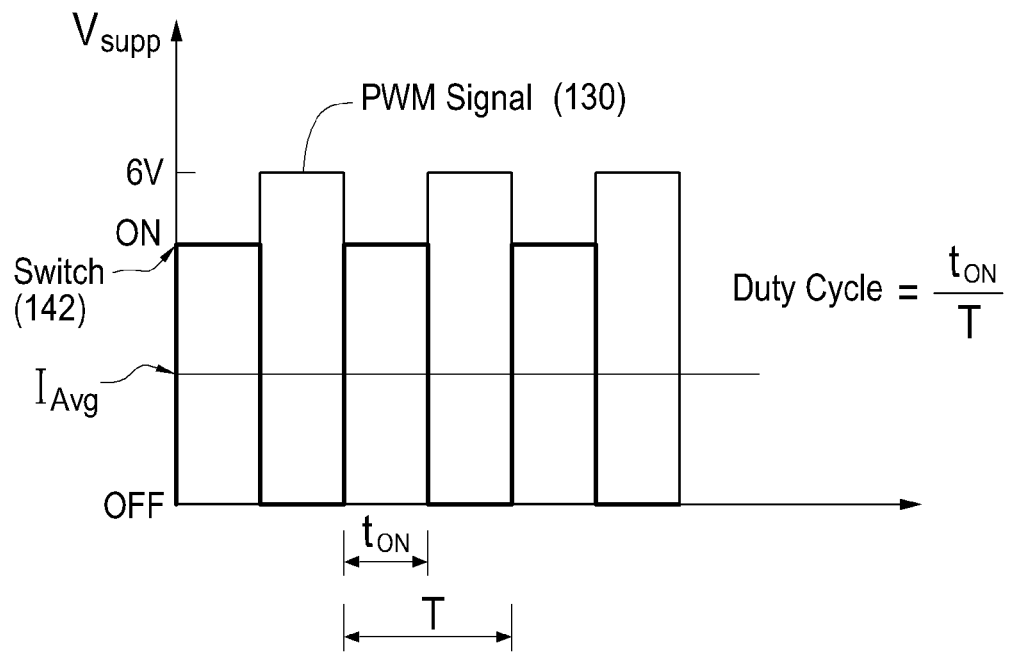
FIG. 15 is a graph of a pulse width modulation ("PWM") signal passing through the circuit shown in the mode of FIG. 14 and being modulated by a switch.

The microprocessor 31 periodically activates the first switch 142 in accordance with the position of the outboard propulsion unit. Referring to FIG. 15, when the first switch 142 is "on" (as indicated by $t_{ON}$), current is drawn from the circuit 133. A duty cycle, equal to the ratio of $t_{ON}$ over total cycle time T, is generated by the periodic activation of the first switch 142 thereby. The "low time" or switch activated time is required to sink current in order to mimic or "fake" the resistance that would normally be generated by, for example, the rotary trim position sensor of the prior art.

Figure 16:
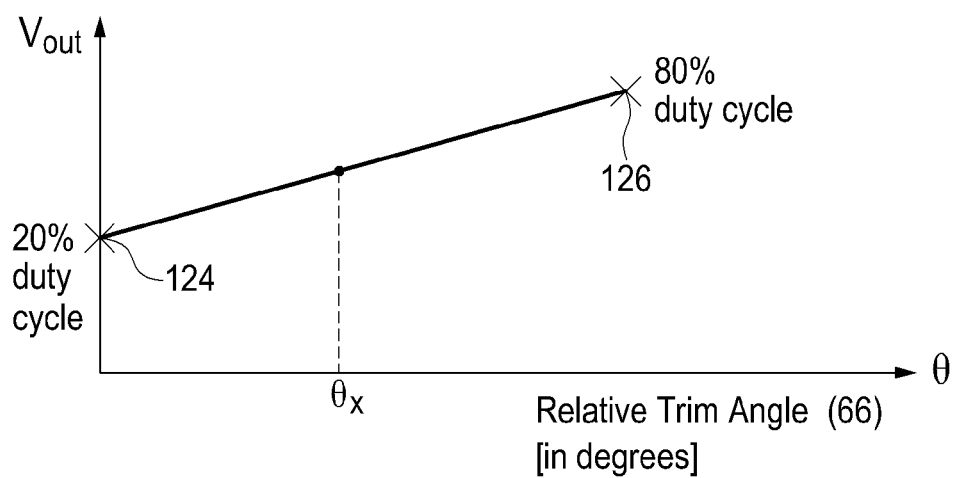
FIG. 16 is a graph of the output voltage for a gauge display unit as a percentage of duty cycle for a given relative trim angle.

As the position of the magnet 24 mounted on the rotatable shaft 36 (shown in FIG. 2) varies with respect to the magnetoresistive transducer 28, the microprocessor 31 will in turn vary the width of the pulses. By varying the duty cycle, the output voltage may be varied in a manner corresponding to the position of the outboard propulsion unit and in a form readable by for example the analog gauge display unit 120. This is illustrated in FIG. 16 which shows the output voltage $V_{out}$ for the analog gauge display unit as a percentage of duty cycle for a given relative trim angle 66. Thus, the microprocessor 31 reads the signal of the position of the magnet and transmits an output voltage within the range of voltages that the user has specified. Put another way, the extent of current being pulled through activating the mosfet switch determines the position of, for example, the analog trim gauge display. Increasing or decreasing the amount of current sunk will either increase or decrease the needle position on the gauge display unit 120. The current sink provided by the system mimics the current sink that traditionally occurs when using a potentiometer to sense trim angle. The power/signal wire 134 thus also acts as a signal wire, conveying back a variable current to the analog trim gauge display unit 120. The microprocessor 31 alternates the signal to the first switch 142 so that it can receive power to drive the electronics but also sink current causing the needle of the analog gauge display unit 120 to move.

The switches 142 and 158 are controlled by the same microprocessor signal, and thus both switches 142 and 158 are activated. However since only one analog gauge display unit 120 is connected to terminal 135, switch 158 will simply switch and do nothing since no load is connected to it. Terminal 149 can simply be left unconnected as it has no effect.

In one example the average current output $I_{avg}$ may simulate 11 ohms when the outboard propulsion unit 52 is in the fully lowered position shown in FIG. 4. The resistance increases as the outboard propulsion unit 52 rises upwards, from the perspective of FIG. 4, at a rate of, for example, 2.3 ohms per degree angle.

3-Wire Dual Analog Mode

Figure 17:
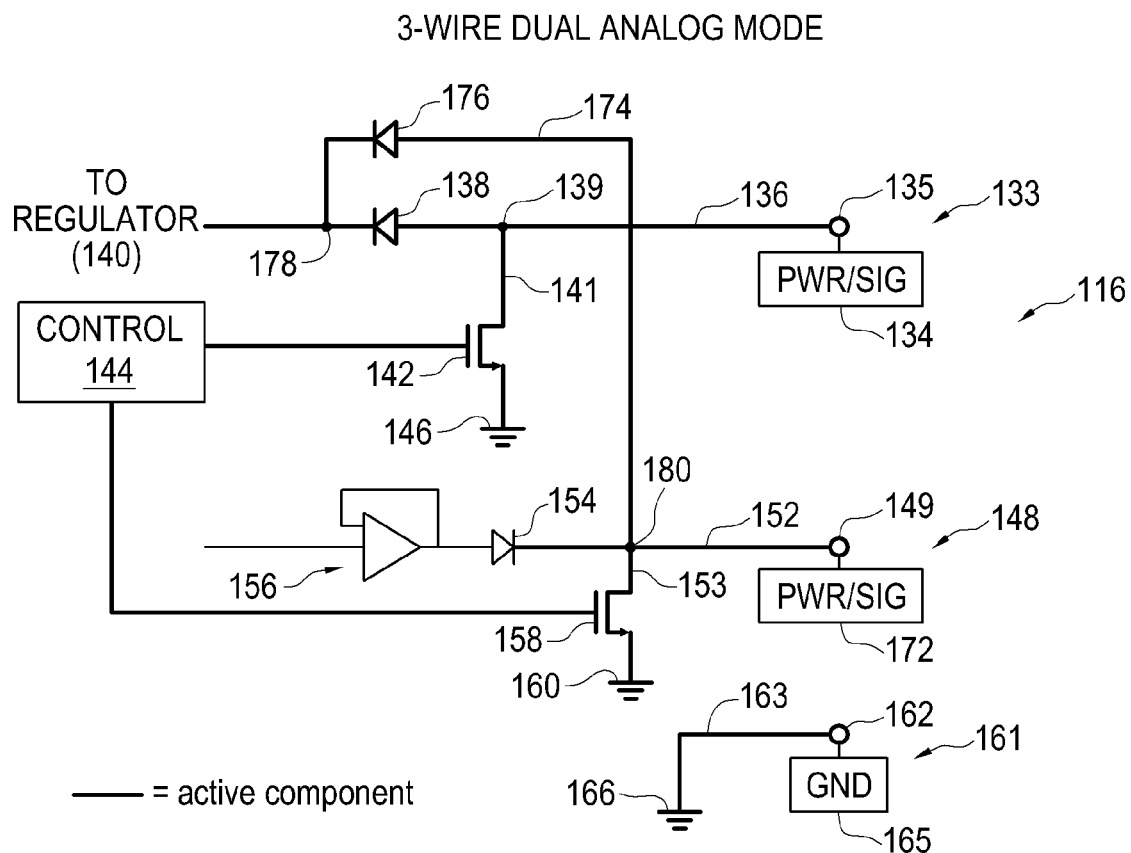
FIG. 17 is a schematic of the output circuitry of FIG. 13 shown operating in a 3-wire dual analog mode.
Figure 18:
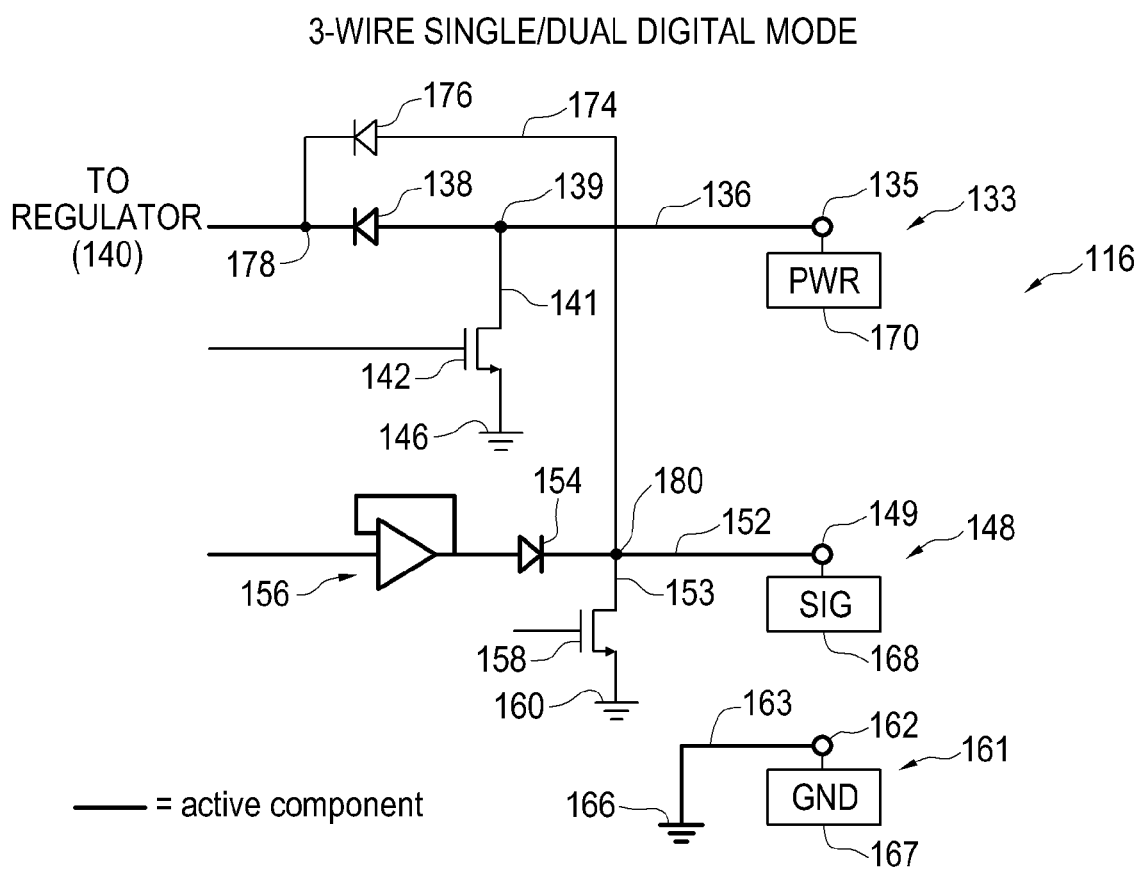
FIG. 18 is a schematic of the output circuitry of FIG. 13 shown operating in a 3-wire single/dual digital mode.

Referring to FIG. 17, if the voltage measured at junction 178 is relatively high, because for example a power/signal wire 172 from the further analog gauge display unit 122 is also connected to terminal 149, the microprocessor determines that is should operate in the 3-wire dual analog mode.

The apparatus 20 operates in a very similar fashion to that of the 2-wire single analog mode and therefore will not be discussed in great detail. In this case terminal 135 is connected to the power/signal wire 134 of the analog gauge display unit 120 as before, terminal 149 is connected to the further power/signal wire 172 of the further analog gauge display unit 122, and terminal 162 is connected to a ground wire 165. The microprocessor 31 ascertains that the voltage at the conductor 136 (or across the power/signal wire) is above the set threshold of, in this example, 6 volts and that the voltage is relative high. The microprocessor 31 through a single pin controls and activates both the first switch 142 and the second switch 158, as illustrated by control 144. The "active" components of the output circuitry 116 are illustrated by way of slightly darker font lines.

In a like manner as described above for the 2-wire single analog mode, current is sunk during the switch-activated-time in order to mimic or "fake" the resistance that would normally be generated by, for example, the rotary trim position sensor(s) of the prior art. By varying the duty cycles of the switches 142 and 158, the output voltages may be varied in a manner corresponding to the position(s) of the outboard propulsion unit(s) and in a form readable by analog gauge display units.

3-Wire Single Dual Digital Mode

The operation of the apparatus 20 in the 3-wire single/dual digital mode is shown in FIG. 18. In this case terminal 135 is connected to a power wire 170 of the single/dual digital gauge display unit 118, terminal 149 is connected to a signal wire 168 of the single/dual digital gauge display unit 118 and terminal 162 is connected to a ground wire 167. Below the set threshold, in this example 6 volts, the microprocessor determines that it should operate in a digital mode. Put another way the microprocessor 31 ascertains that the voltage at the conductor 136 (or across the power/signal wire) is below the set threshold of, in this example, 6 volts. The "active" components of the output circuitry 116 are illustrated by way of slightly darker font lines. The active components include the operational amplifier 156, diode 154, and terminal 149.

The microprocessor causes the signal from the power/signal wire passing through the conductor 136 and diode 138 to pass through to a different circuit. The pin of the microprocessor 31 controlling the operational amplifier 156 is activated. The microprocessor causes a signal to pass through the operational amplifier 156, diode 154 and conductor 152, resulting in a modified signal passing through the signal wire 168 for the gauge display unit. The modified signal through signal wire 168 will have a voltage level between that of the power signal wire and ground. In the 3-wire single/dual digital mode, there is provided therefore a slightly different output range. The PWM signal is filtered and the output from the output circuitry 116 is a constant voltage signal that will vary in accordance with the position of the outboard propulsion unit.

Advantages Provided by the Invention

The tilt and trim sensor apparatus as herein disclosed provides many advantages. For example the tilt and trim sensor apparatus as herein disclosed provides the advantage of being a single part that replaces three different parts. The tilt and trim sensor apparatus as herein disclosed works with 2-wire systems, taking the part of a single analog gauge for trim position. The tilt and trim sensor apparatus functions in this manner by simulating a variable resistor. The tilt and trim sensor apparatus as herein disclosed also interfaces with 3-wire dual analog gauge display units 120 and 122, which are found, for example, where there is more than one station, such as in a multi-helm situation.

The tilt and trim sensor apparatus as herein disclosed works with 3-wire sensor systems, taking the part of a 3-wire mode sensor having a digital gauge. The tilt and trim sensor apparatus functions in this manner by simulating a potentiometer. In this situation the tilt and trim sensor apparatus as herein disclosed plugs into an engine management box or other engine control units. The tilt and trim sensor apparatus can also interface with dual digital systems.

Because the tilt and trim sensor apparatus as herein disclosed takes the place of the three different parts, this provides the advantage of reducing the number of parts and inventory of parts. It is fully compatible in fit, form and function with the following part numbers available at Teleflex Canada Inc.: Teleflex Part No. 3840830, which has a 2-wire, shaft configuration; Teleflex Part No. 3841840, which has a 3-wire shaft configuration; and Teleflex Part No. 3849411, which has a 3-wire configuration with a slightly different shaft compared to Part No. 3841840.

The tilt and trim sensor apparatus as herein disclosed provides the advantage of automatically detecting whether it is working with a 2-wire single analog mode system, a 3-wire dual analog mode system, or a 3-wire single/dual digital mode system based on the voltage being received by the tilt and trim sensor apparatus.

The tilt and trim sensor apparatus as herein disclosed provides the advantage of allowing all output and calibration parameters to be customizable to fit customer needs.

In one example of the tilt and trim sensor apparatus as herein disclosed, the total application sensing accuracy for trim applications is $<\pm 0.5$ degrees, and a performance: accuracy of <0.3 degrees, linearity of <0.6 degrees, and a hysteresis linearity of <0.3 degrees. This is in contrast to potentiometers of the prior art, which may have a total application accuracy for trim applications of $<\pm 2$ degrees, and a performance: accuracy of <0.9 degrees, linearity of <1.75 degrees, and a hysteresis linearity of <3.5 degrees.

The tilt and trim sensor apparatus as herein disclosed has very low operating friction.

The tilt and trim sensor apparatus as herein disclosed provides an inherently robust design. By completely filling and thereby sealing the recess 32 of the tilt and trim sensor apparatus with over-seal potting compound for example, the need for any further environmental sealing of the tilt and trim sensor apparatus is reduced and/or eliminated. This is in contrast to a conventional potentiometer of the prior art, which has moving resistive element parts that tend to wear out.

The tilt and trim sensor apparatus as herein disclosed provides the advantage of being self-calibrating. The tilt and trim sensor apparatus can be installed in any configuration: the angle sensing range for calibration purposes can be anywhere within the 360 degrees of rotation comprising the two 180 degree sensing regions 96 and 98 illustrated in FIG. 7. The tilt and trim sensor apparatus therefore does not require any set initial orientation. Also, the tilt and trim sensor apparatus can be mounted in any rotational position and therefore no mounting adjustment is needed. This is contrast to systems of the prior art where a manual rotation of the rotary trim sensor within mounting slots commonly is required until the trim gauge correctly reads, for example, the fully lowered position of the propulsion unit.

By using magnetic field sensing, in this case via the magnetoresistive transducer 28 and the magnet 24, the apparatus does not need the rotatable interface shaft 36 to be completely aligned with a pivot point recess, as is the case with devices of the prior art. With rotary trim sensors of the prior art, there may be potentiometer shaft binding problems arising from the manner of installation. This is particularly true where the potentiometer shaft is installed in a radially or axially slightly misaligned manner. In such situations, the outboard propulsion unit may for example move before the potentiometer shaft rotates. This may lead to premature wear of the rotary trim sensors and cause reading errors. Also the tilt and trim sensor apparatus as herein disclosed provides a certain degree of room and play within its bearing 38, spacer 40 and recess 34. As a result, the tilt and trim sensor apparatus as herein disclosed advantageously reduces the need for its installation to meet the precise installation alignment requirements of some prior art devices.

Variations to the Invention

Those skilled in the art will appreciate that many variations are possible within the scope of the invention.

For example the magnet 24 may be mounted to the housing 30 instead of the rotatable interface shaft 36, with the magnetoresistive transducer 28 being mounted on the rotatable interface shaft 36 instead of the housing 30. Instead of using a magnet as a separate part, the rotatable interface shaft 36 may itself be magnetized or have a magnetic portion. The rotatable interface shaft 36 may be operatively connectable to the outboard propulsion unit 52 and the housing 30 may be operatively connectable to the stern 49 of the marine craft 48.

The tilt and trim sensor apparatus as disclosed herein can be used in combination with a trim limit switch. The tilt and trim sensor apparatus as disclosed herein also can be used in combination with the integrated magnetostrictive linear displacement transducer and limit switch, or parts thereof, as disclosed in U.S. patent application Ser. No. 12/464,238 to Sall et. al, the full disclosure of which is incorporated herein by reference.

In a variation a Hall effect sensor may be used in place of the magnetoresistive sensor. However the magnetoresistive transducer is preferred because it can tolerate a high degree of manufacturing and assembly variation. Magnetoresistive sensing is based of magnetic field angle not field strength as is the case with Hall effect sensors. Magnetization and temperature variation affect Hall effect sensing. More importantly, magnetoresistive sensing allows a high degree of offset between the shaft axis and the sensing element. For example, a 9.5 mm diameter ceramic 8 magnet allows for a +/−3 mm positional tolerance whereas a Hall effect sensor such as Austria Microsystems AS5045 requires a +/−0.25 mm positional tolerance.

It will be understood by someone skilled in the art that many of the details provided above are by way of example only and are not intended to limit the scope of the invention which is to be determined with reference to the following claims.

What is claimed:

1. A tilt and trim sensor apparatus comprising:
   a housing;
   a shaft rotatably mounted to the housing;
   a magnet connected to one of the housing and the shaft;
   a transducer connected to another of the housing and shaft, the transducer disposed adjacent to the magnet for sensing the position of the magnet and outputting a signal representative of an angular position of the magnet;
   output circuitry including a terminal for connecting to one of an analog gauge display unit and a digital gauge display unit; and
   a microprocessor configured to ascertain a voltage at the terminal and determine whether the display unit is the analog gauge display unit or the digital gauge display unit based on the voltage, the microprocessor also being configured to receive the signal from the transducer and to operatively tailor the signal for the one of the analog gauge display unit and digital gauge display unit based on the voltage at the terminal;
   the apparatus receiving power via the terminal, the microprocessor being configured to determine whether the voltage at the terminal is above or below a threshold voltage when the display unit is connected to the terminal, the microprocessor ascertaining whether the display unit is the analog gauge display unit or the digital gauge display unit based on the voltage measured at the terminal, and causing the output circuitry to output a signal based on the output of the magnetoresistive transducer that is in accordance with said one of the analog gauge display unit and the digital gauge display unit.

2. The apparatus as claimed in claim 1 wherein the electrical characteristic is a voltage.

3. The apparatus as claimed in claim 2 wherein the microprocessor is configured to ascertain whether the voltage at the terminal is above or below a threshold voltage, the microprocessor ascertaining that the terminal is connected to a digital gauge display unit when the voltage is below the threshold voltage.

4. The apparatus as claimed in claim 3 wherein the microprocessor ascertains that the terminal is connected to an analog gauge display unit when the voltage at the terminal is above the threshold voltage.

5. The apparatus as claimed in claim 4 wherein the threshold voltage is pre-programmed to be 6 volts.

6. The apparatus as claimed in claim 2 wherein the output circuitry further includes a further terminal for connecting to one of a further analog gauge display unit and a further digital gauge display unit, the microprocessor being configured to ascertain the voltage at the further terminal and thus determine whether the further display unit is the further analog gauge display unit or the further digital gauge display unit based therefrom, the microprocessor being configured to receive the signal from the transducer and operatively tailor the signal for the one of the further analog gauge display unit and the further digital gauge display unit so determined.

7. The apparatus as claimed in claim 1 wherein the output circuitry is configured to operatively receive the signal, the output circuitry includes a switch operatively connected to the terminal and a ground, and the microprocessor tailors the signal by selectively activating the switch, the apparatus being configured to mimic a variable resistor.

8. The apparatus as claimed in claim 1 wherein the transducer is a magnetoresistive transducer.

9. The apparatus as claimed in claim 8 wherein the magnet, the magnetoresistive transducer, the output circuitry and the microprocessor are disposed within the housing.

10. The apparatus as claimed in claim 9 further including a potting compound filling the housing, the potting compound protecting the magnetoresistive transducer, the output circuitry and the microprocessor thereby.

11. The apparatus as claimed in claim 1 wherein the transducer is a Hall effect sensor.

* * * * *